United States Patent [19]

Waenerlund et al.

[11] 4,095,078
[45] June 13, 1978

[54] PACKING WIRE CUTTING DEVICE

[75] Inventors: Lars Waenerlund, Munkedal; Torsten Boböck, Sodertalje, both of Sweden

[73] Assignee: Munkedals Aktiebolag, Munkedal, Sweden

[21] Appl. No.: 646,654

[22] Filed: Jan. 6, 1976

[51] Int. Cl.² .............................................. B23K 11/22
[52] U.S. Cl. ...................................... 219/68; 83/909; 219/79; 219/84
[58] Field of Search .................. 219/68, 119, 162, 56, 219/82, 84, 79, 80; 83/909, 924, 412

[56] References Cited

U.S. PATENT DOCUMENTS

| | | | |
|---|---|---|---|
| 1,137,834 | 5/1915 | Bowers | 219/119 X |
| 1,569,397 | 1/1926 | Robertson | 219/162 |
| 2,667,557 | 1/1954 | Herzog | 219/68 |
| 2,786,127 | 3/1957 | Osweiller | 219/56 |
| 3,260,833 | 7/1966 | Rösler | 219/84 X |
| 3,341,683 | 9/1967 | McConnell | 219/80 |
| 3,684,474 | 8/1972 | Chisholm | 219/68 X |

Primary Examiner—J. V. Truhe
Assistant Examiner—N. D. Herkamp
Attorney, Agent, or Firm—Oblon, Fisher, Spivak, McClelland & Maier

[57] ABSTRACT

In accordance with one embodiment of the invention the packing-wire cutting device includes an electrical electrode assembly comprising a pair of arms pivotally mounted on a bearing shaft, the ends of the arms remote from the bearing shaft carrying each one a rotatable disc together forming an electrode roller supplied with electric power from a supply circuit normally open at the electrode roller which has a gap between its rotatable discs. Further the packing-wire cutting device comprises a conveyor path for the goods to be treated by said device, said goods being provided with a packing of wires crossing the sides of the goods. When the goods passes the packing-wire cutting device the electrode roller is caused to pivot towards the goods side so as to engage against this side to be rotated when the goods is advancing so that when any of the wires is passing the electrode roller it closes the supply circuit whereby the section of the wire located between the rotatable discs will melt off.

2 Claims, 3 Drawing Figures

PACKING WIRE CUTTING DEVICE

The present invention relates to a packing-wire cutting device, particularly for use as a paper-pulp bale-opener.

In the art of goods hauling packing is often executed with metal wires or bands which are cut off at the place of delivery of the goods. Such wire cutting operations, as a rule, are made by hand and involve relatively high personnel requirements, thus being a rather laborous and awkward method, particularly where the goods is presented in the form of a large series of separate units.

One example of such goods which is delivered in large series is bales of paper pulp which are secured for transporation by metal wires. Such baling wires must be removed before the bale of paper pulp can be introduced into the refinement procedure. For this purpose, up till now, manual labour has been utilized, requiring a relatively large staff of workment to cut off all the wires contained in the wire packing. In large processing units, the paper-pulp bales are fed in on a conveyor, which requires a continuous activity for cutting off the wire- or band-packings. This is a heavy and monotonous work, and since the paper-pulp bales show extremely slight variations in size, this work is well suited for automation.

Hitherto, such automation has been considered not to be practiable, because the tool wear involved is great and the packing wires or bands are unevenly tightened about the pulp bales so that they are sometimes sunk-down into the pulp, thereby being relatively difficult to reach with a cutting tool. In addition, the baling wires employed are varying in quality, because there are sometimes knots and tangles of wire at various places of the wire packing which must be taken into account in the bale-opening operation.

The problems thus discussed, however, are obviated by the wire-cutting device according to the present invention. This wire-cutting device comprises at least one electrode assembly which is applicable against the wire or wires and adapted, by power supplied from a source of electrical current to melt off said wire or wires.

Owing to the fact that the wires need only come in touch with the electrode assembly, no substantial tool wear will occur, and even if the wires have sunk down into the baled goods, this will not prevent the electrode from affecting the wire, since a relatively small contact area between electrode and wire during a relatively short period of time is sufficient to effect the melting action aimed at. Previous apprehensions against the employment of some sort of fuse- or melt-cutting procedure for cutting off the packing wires on such goods as paper-pulp bales because of any fire hazard, have been found to be entirely unjustified as fas as the employment of the device according to the present invention is concerned. The electrical heating occurs over an extremely limited area, and since the paper pulp contains a large amount of humidity, no fire hazard will result. Any danger of ignition can be further reduced by spraying the bale with water, especially at the fusing locality, during the baling-wire removal procedure. This also will involve the advantage of avoiding any discolouration of the paper pulp.

By an adequate construction of the electrode assembly and the other components forming part of or associated with the electrical packing-wire cutting device, further advantages of the wire-cutting device will be obtained, resulting in that its operation may be completely automated. Such developments will be disclosed in the appended sub-claims.

The invention will be described more in detail hereinafter with reference to the accompanying drawings, in which.

Figure 1:
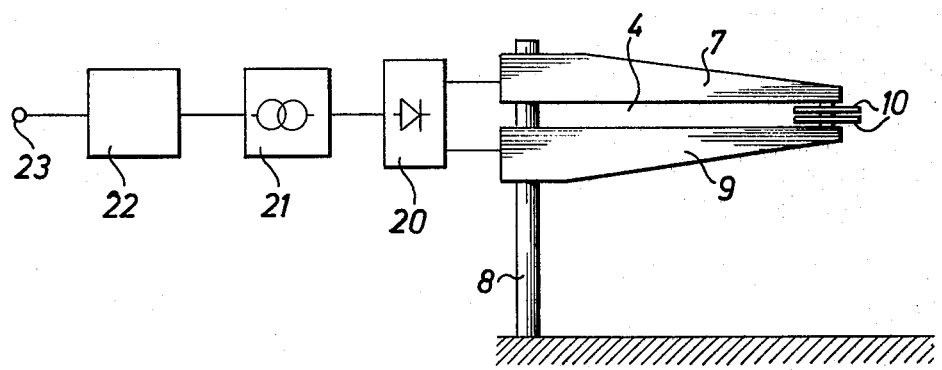
FIG. 1 is a diagrammatical view illustrating a preferred embodiment of the electrode arrangement of the packing-wire cutting device of the present invention.

In FIG. 1 a preferred embodiment of an electrode assembly 4 for an electrical packing-wire cutting device according to the present invention is illustrated. The electrode assembly 4 comprises a pair of arms 7 and 9 which are pivotally mounted on a bearing shaft 8, the ends of the arms remote from the bearing shaft 8 carrying each one half of the electrode assembly, these halves being, in this instance, in the form of rotatable discs 10 forming together an electrode roller. The electrode roller 10 has electric power supplied to it from a power-supply circuit comprising protective and control devices 22 connected to the mains 23, as well as a transformer 21 and, optionally, a rectifier circuit 20. The electric power supply circuit is normally open at the electrode roller which has a gap between its rotatable discs 10.

Figure 2:
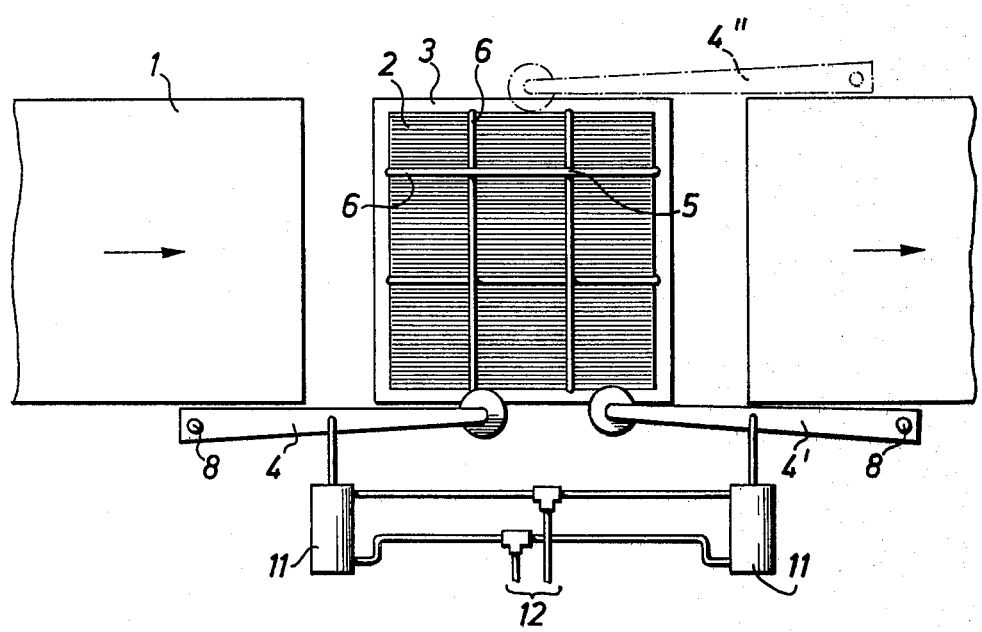
FIG. 2 illustrates the principles of an inventive embodiment of a packing-wire cutting device comprising a plurality of electrode-carrier arms.

It is seen from FIG. 2 that the arms 7, 9 of the electrode assembly 4 (see FIG. 1) are angularly movable about the bearing shaft 8 by a pneumatic or hydraulic actuator 11 which is operated by a pressure source connected to supply pipes 12.

It is further seen from FIG. 2 that the packing-wire cutting device of the present invention comprises a conveyor path 1 for the goods to be treated by said device. This goods, in the present case, is in the form of bales 2 of paper pulp which for hauling purposes are provided with a packing 5 of baling wires comprising wires 6 which cross each other at two opposite bale sides, whilst the remaining bale sides are crossed by vertically extending wires 6 only (see FIG. 3).

The packing-wire cutting, or bale opening, device may include one or several electrode assemblies 4 which may be disposed at one single side of the conveyor path 1, as shown for the electrodes 4, 4', and/or at both sides of this path 1, as indicated by the electrode 4" as shown in broken lines. In order to enable all of the vertical wires 6 comprised in the wire-packing 5 to be cut off by the actual electrode assembly 4 (and 4', 4", if present), the bale 2 must be turned, which operation is arranged to be carried out by a turntable 3 incorporated in the conveyor path 1.

As a paper-pulp bale 2 enters the turntable 3, the respective electrode assembly 4, 4', 4" is caused to pivot towards the adjacent bald side so as to engage the electrode roller 10 against this side. Such pivotal movement, as already mentioned, is effected by the pressure cylinder 11 which urges the electrode roller 10 against the bale side at a predetermined contact pressure. The electrode roller 10 and its arms 7, 9, however, possess a certain degree of resiliency to compensate the contact pressure for irregularities in the surface of the bale 2 and for distance variations when turning the bale 2 by the turntable 3. The electrode rollers 10 are used to rotate when the bale 2 is being advanced, and any wires 6 passing the electrode rollers 10 in the course of the advancing are cut off because they close the electrical power supply circuit through the electrode halves 10 of the electrode rollers, whereby the section of the wire 6 located between the electrode halves 10 will become heated to melting temperature and thus will melt off.

The advancement of the bale 2 is interrupted when the entire bale 2 has been moved onto the turntable 3, after which the latter is rotated in order to cause all of the vertically extending wires 6 to move past the electrode rollers 10. After the bale 2 has been rotated through a predetermined fraction of a complete turn, viz. by 90 degrees if electrode assemblies are present on either sides of the conveyor path 1, and by 270 degrees if electrode assemblies are disposed at one single side thereof, the removal of the bale 2 will start, in which operation any remaining vertical wires 6 will be cut off. As the bale 2 leaves the turntable 3, the electrode assemblies 4, 4', 4" are returned to their original positions by the pressure cylinders 11.

Figure 3:
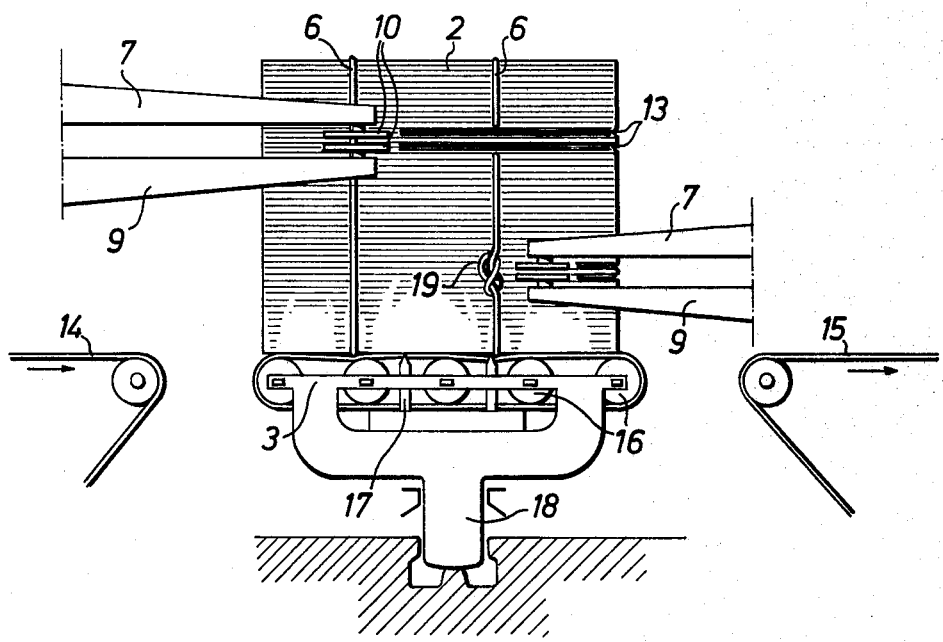
FIG. 3 is a side-elevational view of the embodiment shown in FIG. 2.

FIG. 3 shows a side elevation of an electrical packing-wire cutting device corresponding to that one illustrated in FIG. 2. The paper-pulp bale 2 has been transferred to the turntable 3 from the band 14 of the conveyor 1. When the transfer to the turntable 3 is completed, the retaining means of the latter, being in the present case in the form of a "spiked mat" 17, will have been caused to grip into the bottom surface of the bale 2. The position of the bale 2 as illustrated in FIG. 3 is that occupied after turning the bale 180 degrees from the transfer position. The turning is effected by an actuator (not shown) acting on the pivotally mounted part 18 of the turntable 3. Since, in the position shown, the cutting device has been operated to cut off the packing wires at two of the bale sides, the bale 2 has grooves 13 made by the electrode rollers 10. These grooves 13 also indicate that the rollers 10 engage the bale side with a certain predetermined pressure. As shown in FIG. 3, the rollers 10 and their associated carrier arms 7 and 9 are disposed at different levels. The purpose of such arrangement is to warrant a sure cutting-off of the wires 6. As indicated by the knot 19 in the right-hand wire 6 in FIG. 3, the wire packing may contain localised wire tangles which are too massive to be able to become melted through by the electrode. Since such knots or tangles 13 will only be present at localised places, it is possible, by disposing electrodes at different levels, to ensure that each wire 6 will become severed at least once on each bale side, as shown for the right-hand wire 6, at the level of the upper electrode.

When the bale 2 has been turned so that all of the wires 6 extending across its sides have become severed, the retaining means 17 are caused to disengage and release the bale 2, and a power actuator, not shown, for the conveyor rolls 16 of the turntable 3 is started to move the bale 2 onto a removal conveyor 15 forming part of the conveyor unit 1. Thereafter, a new bale can be transferred to the turntable 3 to have its wire-packing removed from it.

The conveyor rolls 16 of the turntable 3 may be supplemented by a conveyor belt driven thereby. Other conveyance means could, of course, be utilised, as well, and the possibilities of driving the conveyance means must be taken into account in determining the rotation of the turntable 3. Using the conveyance device with rolls 16, as here shown, the turntable 3 will have to be rotated through a 180° or 360°.

As already indicated, the wire-cutting device can be modified in various ways. Thus, one single electrode or a plurality of electrodes may be used, the number of electrodes being theoretically unlimited. The disposition of the electrodes may be as shown in FIGS. 2 and 3, it being also conceivable, however, to dispose the same in vertically spaced relation and with their arms extending from one single bearing shaft or from juxtaposed bearing shafts. The electrodes need not necessarily be in the form of rollers, but may instead be in the form of sliding contacts, suitably made of tungsten and engaging the bale side at a predetermined pressure. Irrespective of the design of the electrodes, the actual fusing point may be sprayed with water in order to avoid any miscolouring or ignition of the paper pulp. The power-supply circuit for the electrodes may be common for all the electrodes, or one or more electrodes may be connected to separate power-supply circuits, respectively. Such supply circuits may be designed for supplying AC-power at frequencies from zero up to thousands of Hertz. Furthermore, the relative movement of the bale past the electrodes may be effected in different ways, and the electrodes need not necessarily be immobile.

From the description hereinbefore it is seen that the electrical wire-cutting device according to the invention must not be considered to be limited to the embodiments illustrated in the drawings, since various modifications are possible without departing from the scope of the invention as defined in the appended claims.

We claim:

1. A packing wire cutting device for cutting packing wire wrapped in the form of a parallelogram around a paper pulp bale in the form of a parallelepiped, the packing wire cutting device functioning to cut the packing wire on one side of the paper pulp bale, comprising
    an electrode comprising two electrode halves separated by a gap,
    means for causing relative movement between the electrode halves and said one side of the paper pulp bale,
    the packing wire on said one side of the paper pulp bale being disposed transverse to the direction of relative movement of the electrode halves and said one side of the paper pulp bale so that the packing wire on said one side of the paper pulp bale will intersect the electrode halves irrespective of the exact position of the electrode halves during relative movement between the electrode halves and said one side of the paper pulp bale,
    means for forcing the two electrode halves into said one side of the paper pulp bale to cause the electrode halves to be bridged by the packing wire during relative movement between the electrode halves and said one side of the paper pulp bale, and
    means for applying electrical power to the two electrode halves to melt and thereby sever the packing wire passing therebetween during relative movement of the electrode halves and said one side of the paper pulp bale.

2. A packing-wire cutting device to be used as an opener for packing-wire wrappings on paper-pulp bales advancing along a conveyor path which includes a wire cutting station, the packing-wire wrappings being made up of a wire or wires encircling the bales to keep the bales together, each wire being meltable by electrical power, comprising:

a conveyor path having incorporated therein a wire cutting station including at least one rotatable electrode having two halves and a turntable to cause the advancement of the bales during the wire-cutting operation to be a rotary motion at a predetermined rate so that all of the wires forming part of the packing-wire wrapping and extending across the sides of the bales will be brought into contact with said at least one electrode and be melted or fused off, the cutting station further having two or more pairs of pivotable arms or levers disposed above one another and each of said pairs carrying one said rotatable electrode, the position of the wire or wires along the bale sides being located by at least one electrode forced into contact with the bale, the electrode halves being connected to a power-supply circuit which is normally open, but which is closed when a wire comes into contact with the electrode halves so that the wire is melted off by the electrical power supplied from the power-supply circuit.

* * * * *